United States Patent
Low et al.

(10) Patent No.: US 9,106,086 B2
(45) Date of Patent: Aug. 11, 2015

(54) DETECTION AND PROTECTION OF DEVICES WITHIN A WIRELESS POWER SYSTEM

(75) Inventors: Zhen Ning Low, La Jolla, CA (US); Adam A. Mudrick, San Diego, CA (US); Sergio P. Estrada, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 12/939,874

(22) Filed: Nov. 4, 2010

(65) Prior Publication Data

US 2011/0221388 A1    Sep. 15, 2011

Related U.S. Application Data

(60) Provisional application No. 61/313,048, filed on Mar. 11, 2010, provisional application No. 61/328,994, filed on Apr. 28, 2010.

(51) Int. Cl.

| | |
|---|---|
| H02J 7/00 | (2006.01) |
| H02J 5/00 | (2006.01) |
| H02J 7/02 | (2006.01) |
| H04B 5/00 | (2006.01) |

(52) U.S. Cl.
CPC ............... *H02J 5/005* (2013.01); *H02J 7/025* (2013.01); *H04B 5/0037* (2013.01)

(58) Field of Classification Search
USPC ......................................... 320/108, 115, 134
See application file for complete search history.

(56) References Cited

U.S. PATENT DOCUMENTS

| | | | |
|---|---|---|---|
| 3,656,132 A | 4/1972 | Brumbelow | |
| 2006/0022815 A1 | 2/2006 | Fischer et al. | |
| 2007/0216392 A1* | 9/2007 | Stevens et al. | ............ 323/355 |
| 2009/0127936 A1 | 5/2009 | Kamijo et al. | |
| 2009/0302800 A1 | 12/2009 | Shiozaki et al. | |
| 2010/0013322 A1 | 1/2010 | Sogabe et al. | |
| 2010/0084918 A1 | 4/2010 | Fells et al. | |
| 2010/0181961 A1 | 7/2010 | Novak et al. | |
| 2010/0207575 A1 | 8/2010 | Pijnenburg et al. | |
| 2010/0222010 A1 | 9/2010 | Ozaki et al. | |
| 2010/0264746 A1 | 10/2010 | Kazama et al. | |

(Continued)

FOREIGN PATENT DOCUMENTS

| | | |
|---|---|---|
| CN | 1954472 A | 4/2007 |
| CN | 101821919 A | 9/2010 |

(Continued)

OTHER PUBLICATIONS

International Search Report and Written Opinion—PCT/US2011/028237—ISA/EPO—Dec. 16, 2011.

(Continued)

*Primary Examiner* — Edward Tso
*Assistant Examiner* — Aaron Piggush
(74) *Attorney, Agent, or Firm* — Knobbe, Martens, Olson & Bear, LLP

(57) ABSTRACT

Exemplary embodiments are directed to detecting and limiting power transfer to non-compliant devices. A method may include detecting one or more non-compliant devices positioned within a charging region of a wireless power transmitter. The method may further include limiting an amount of power delivered to at least one of the one or more non-compliant devices.

26 Claims, 9 Drawing Sheets

(56) References Cited

U.S. PATENT DOCUMENTS

| | | |
|---|---|---|
| 2011/0175705 A1 | 7/2011 | Bellows |
| 2013/0062959 A1 | 3/2013 | Lee et al. |

FOREIGN PATENT DOCUMENTS

| | | |
|---|---|---|
| EP | 0558316 A1 | 9/1993 |
| JP | 2007537688 A | 12/2007 |
| JP | 2009148493 A | 7/2009 |
| WO | WO-2005081115 A1 | 9/2005 |
| WO | WO-2005109597 A1 | 11/2005 |
| WO | WO2005109598 A1 | 11/2005 |
| WO | WO2009081115 A1 | 7/2009 |
| WO | 2010040015 A2 | 4/2010 |
| WO | WO-2010093965 A2 | 8/2010 |
| WO | WO-2013088238 A2 | 6/2013 |

OTHER PUBLICATIONS

Kuyvenhoven, N., et al., "Development of a Foreign Object Detection and Analysis Method for Wireless Power Systems," 2011 IEEE Symposium on Product Compliance Engineering (PSES), pp. 1-6.

* cited by examiner

DETECTION AND PROTECTION OF DEVICES WITHIN A WIRELESS POWER SYSTEM

CLAIM OF PRIORITY UNDER 35 U.S.C. §119

This application claims priority under 35 U.S.C. §119(e) to:

U.S. Provisional Patent Application 61/313,048 entitled "DETECTING AND PROTECTING NEAR FIELD COMMUNICATION CARDS FOR WIRELESS POWER SYSTEM" filed on Mar. 11, 2010, the disclosure of which is hereby incorporated by reference in its entirety; and U.S. Provisional Patent Application 61/328,994 entitled "DETECTING AND PROTECTING NEAR FIELD COMMUNICATION CARDS FOR WIRELESS POWER SYSTEM" filed on Apr. 28, 2010, the disclosure of which is hereby incorporated by reference in its entirety.

BACKGROUND

1. Field

The present invention relates generally to wireless power transfer, and more specifically, to systems, device, and methods for detecting one or more unauthorized devices, one or more near-field communication devices, or a combination thereof, with a charging region of a wireless power transmitter. Furthermore, exemplary embodiments of the present invention relate to systems, device, and methods for limiting wireless power delivery to one or more unauthorized devices, one or more near-field communication devices, or a combination thereof, positioned with a charging region of a wireless power transmitter

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, an NFC device, which is operating at the same frequency or capable of picking up power from a wireless power transmitter, may receive excessive power from the wireless power transmitter. Receiving excessive power may result in undesirable heating of the NFC device, which might be a fire hazard. In addition, a rouge receiver may attempt to pick up power from a wireless power transmitter, thus, which may affect power delivery to a valid receiver and, further, may affect efficiency of a wireless power system. A need exists for detection and, possibly, protection of devices within a wireless power system.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors.

Figure 1:
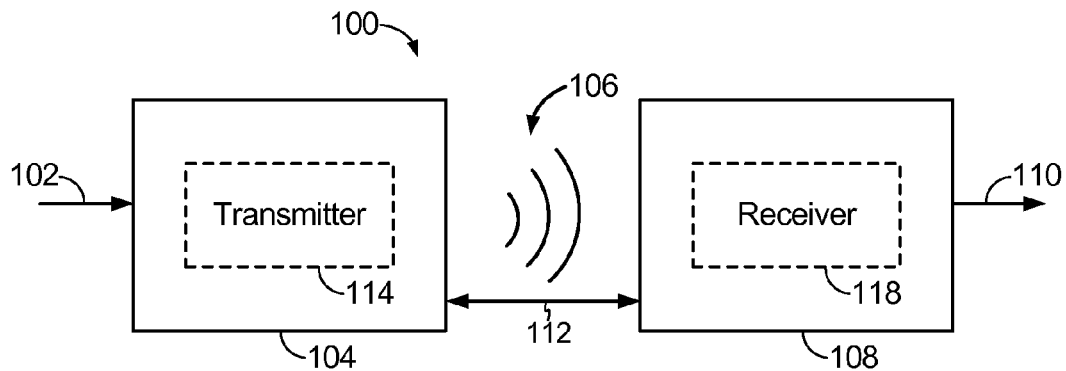
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
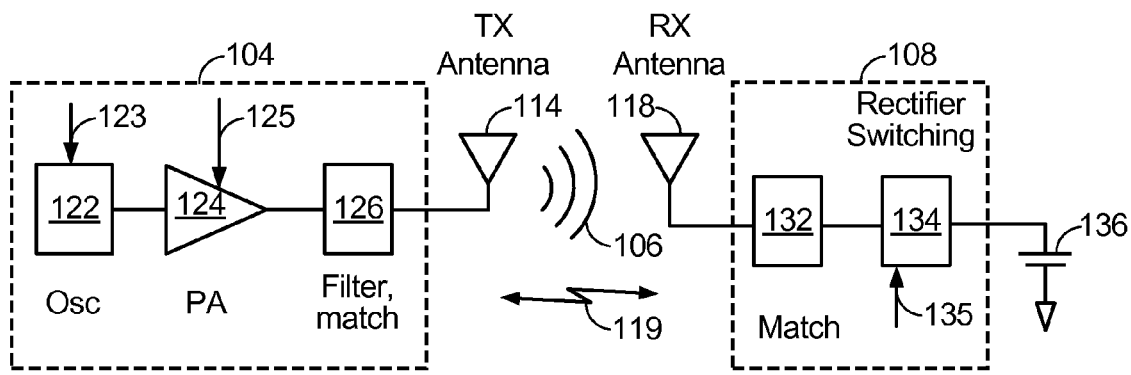
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
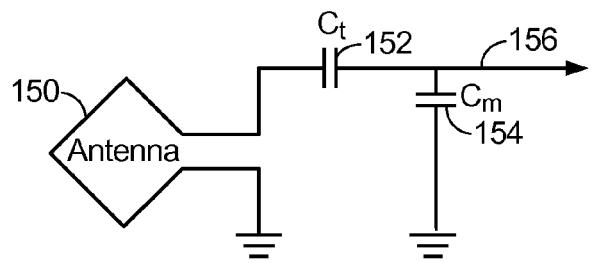
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant (or close to resonant) frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant or near resonant circuits are possible. As another non-limiting example, a capacitor may be placed in parallel between the two terminals of the loop antenna. In addition, those of ordinary skill in the art will recognize that for transmit antennas the resonant or near resonant signal 156 may be an input to the loop antenna 150.

Figure 4:
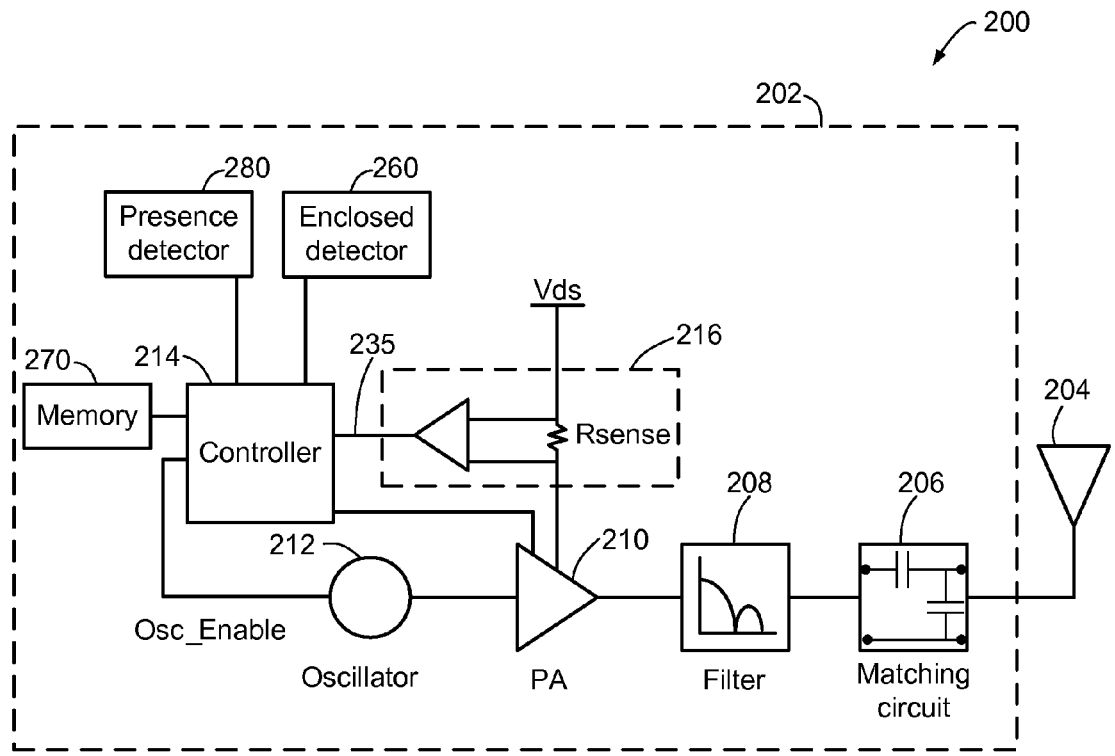
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz or 6.78 MHz ISM bands or 468.75 KHz.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 to 5.0 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
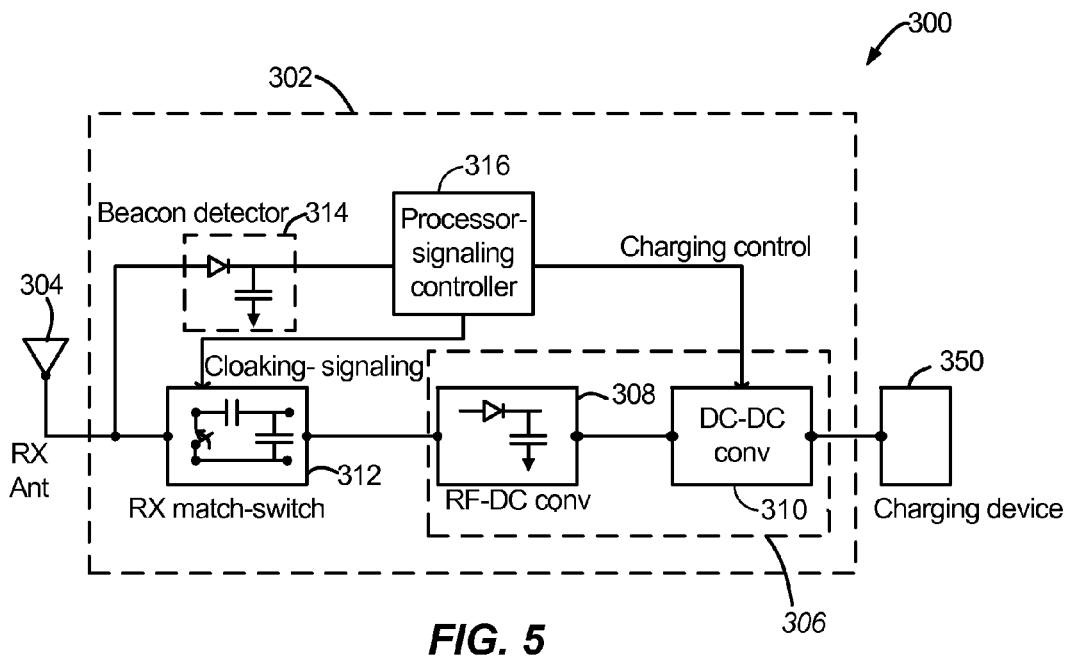
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and detuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Various exemplary embodiments of the present invention, as described herein, relate to systems, devices, and methods for detecting one or more non-compliant devices (e.g., a near-field communication (NFC) card or a rouge receiver) within a charging region of a wireless power device. Furthermore, various exemplary embodiments of the present invention, as described herein, relate to systems, devices, and methods for protecting one or more non-compliant devices (e.g., an NFC card), which are detected within a charging region of a wireless power device.

Figure 6:
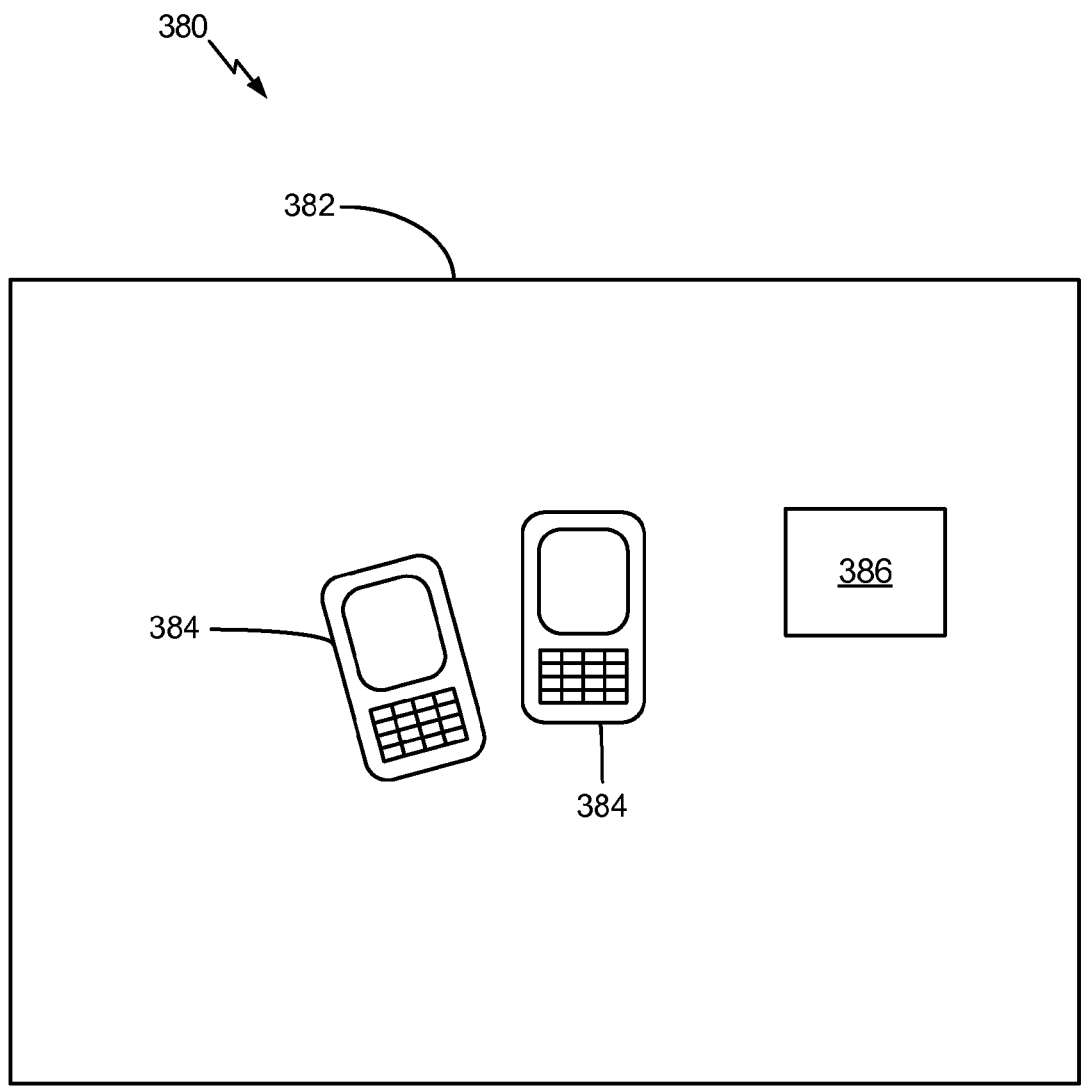
FIG. 6 illustrates a wireless power system including a wireless power transmitter, according to an exemplary embodiment of the present invention.

FIG. 6 illustrates a wireless power system 380 including a wireless charger 382 and a plurality of wirelessly chargeable device 384. Wireless power system 380 further includes a device 386, which may comprise a non-compliant device, such as an NFC device (e.g., an RFID card). Device 386 and each wirelessly chargeable device 384 may be positioned with a charging region of wireless charger 382. According to one or more methods, wireless charger 382 may be configured to detect device 386. Moreover, according to one or more methods, wireless charger 382 may be configured to protect device 386 after detection thereof.

As described herein, wireless charger 382 may be configured to detect, according to one or more methods, one or more non-compliant devices (e.g., device 386) positioned within an associated charging region. As described more fully below, according to one exemplary embodiment, wireless charger 382 may be configured to determine whether or not power, which is being transmitted by a wireless power transmitter (e.g., transmitter 202 of FIG. 4) of wireless charger 382 within an associated charging region, is unaccounted for. According to another exemplary embodiment, after each wirelessly chargeable device 384 is cloaked, wireless charger 382 may be configured to measure one or more properties at a transmitter (not shown in FIG. 6; see transmitter 202 of FIG. 4) to determine whether a non-compliant device is drawing power. According to yet another exemplary embodiment, after each wirelessly chargeable device 384 is clocked, wireless charger 382 may be configured to determine, via one or more measured properties associated with the transmitter and one or more measured properties associated with one or more wirelessly chargeable devices 384, whether a non-compliant device is drawing power.

Furthermore, wireless charger 382 may be configured to, according to one or more methods, protect (i.e., reduce or possibly eliminate power transfer thereto) one or more non-compliant devices (e.g., device 386), which are detected within an associate charging region. As described more fully below, according to one exemplary embodiment, wireless charger 382 may comprise an area, which is proximate an associated transmit antenna (not shown in FIG. 6; see transmit antenna 204 of FIG. 4), that a device should not be positioned. As a more specific example, wireless charger 382 may be configured in a manner to prevent a device, such as an NFC device, from being positioned immediately adjacent a transmit antenna. Therefore, the device (e.g., an NFC device) may not be positioned within a zone with the strongest field. According to another exemplary embodiment, wireless charger 382 may be configured to reduce, or eliminate, (i.e., turn off) the power transferred therefrom. According to yet another exemplary embodiment, a load impedance of each compliant device (e.g., wirelessly chargeable device 384) may be reduced, thus, reducing an amount of power delivered to a non-compliant, which is positioned within an associated charging region.

Figure 7:
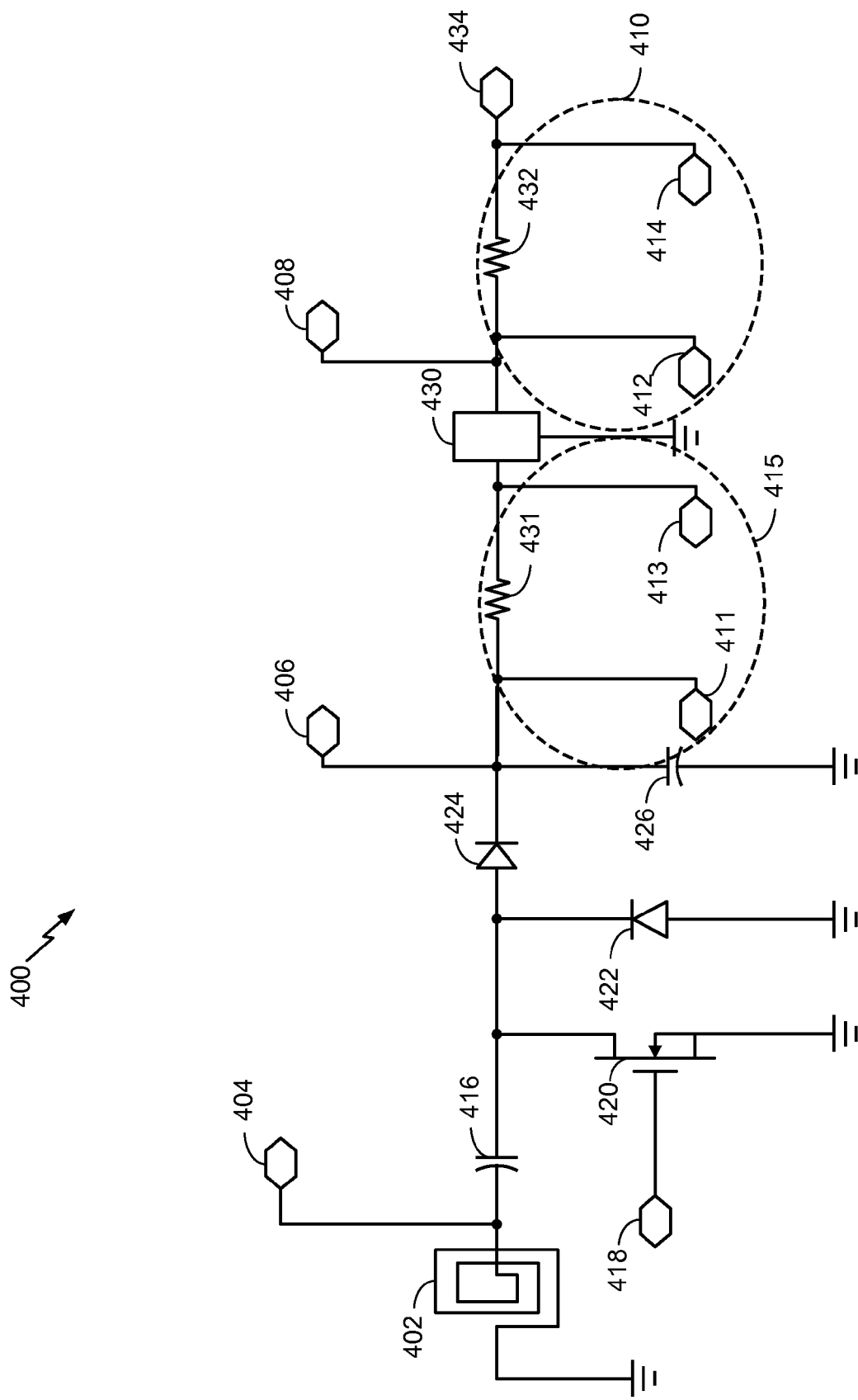
FIG. 7 illustrates a circuit diagram of a portion of a wireless power transmitter, in accordance with an exemplary embodiment of the present invention.

FIG. 7 illustrates a portion of a receiver 400, according to an exemplary embodiment of the present invention. Receiver 400 includes a receiver coil 402, a first current sensor 415, a buck converter 430, a second current sensor 410, and an output 434, which may be coupled to a load. First current sensor 415 may comprise a first current port 411, a second current port 413 and a resistor 431. Similarly, second current sensor 410 may comprise a first current port 412, a second current port 414 and a resistor 432. Furthermore, receiver 400 includes a rectifier voltage port 406 and a buck voltage port 408. Receiver 400 may further include a signaling transistor 420, signaling control 418, a forward link receiver 404, a capacitor 416, and a rectifier, which includes diodes 424 and 422 and capacitor 426.

According to one exemplary embodiment, a wireless power transmitter may be configured to detect power, which is transmitted therefrom, and is unaccounted for. More specifically, by knowing the amount of power transmitted by the wireless power transmitter, the amount of power received by each compliant receiver, the efficiency of a the wireless power transmitter, and the efficiency of each compliant receiver, power which is unaccounted for, if any, may be detected and determined. If a significant amount of power is unaccounted, a non-compliant device may be receiving power. Parameters associated with efficiencies of compliant receivers and the transmitter may be predefined during system calibration and respectively coded in the receivers and the transmitter.

For example, a coil parasitic resistance of each compliant receiver may be premeasured during receiver production and may be determined via a lookup table for various loading conditions. Furthermore, a load impedance for each compliant receiver may be determined from a current sensed by first current sensor 415 and a voltage at rectifier voltage port 406. Accordingly, an efficiency of each compliant receiver's receive coil and rectifier may be calculated. Additionally, via a known voltage at rectifier voltage port 406 and an associated lookup table, an efficiency of each compliant receiver's rectifier may be determined. Moreover, using a known voltage at buck voltage port 408 and a current sensed by second current sensor 410, an efficiency of each compliant receiver's buck converter 430 may be determined.

Furthermore, loss parameters of the wireless power transmitter (e.g., transmitter 202) may be determined. For example, a coil parasitic resistance may be premeasured during production and may be determined via lookup table for various loading conditions. Furthermore, an efficiency of a power amplifier (e.g., power amplifier 210 of FIG. 4) may be premeasured during production and may be determined via lookup table for various loading conditions.

Accordingly, a person having ordinary skill in the art will appreciated that a determination whether there exists unaccounted power by knowing the amount of power transmitted by a wireless power transmitter, the amount of power received by each compliant receiver, the efficiency of a the wireless power transmitter, and the efficiency of each compliant receiver. Furthermore, as noted above, if a significant amount of power is unaccounted for, a non-compliant device (e.g., a rouge receiver and/or a NFC device) may be receiving power.

Figure 8:
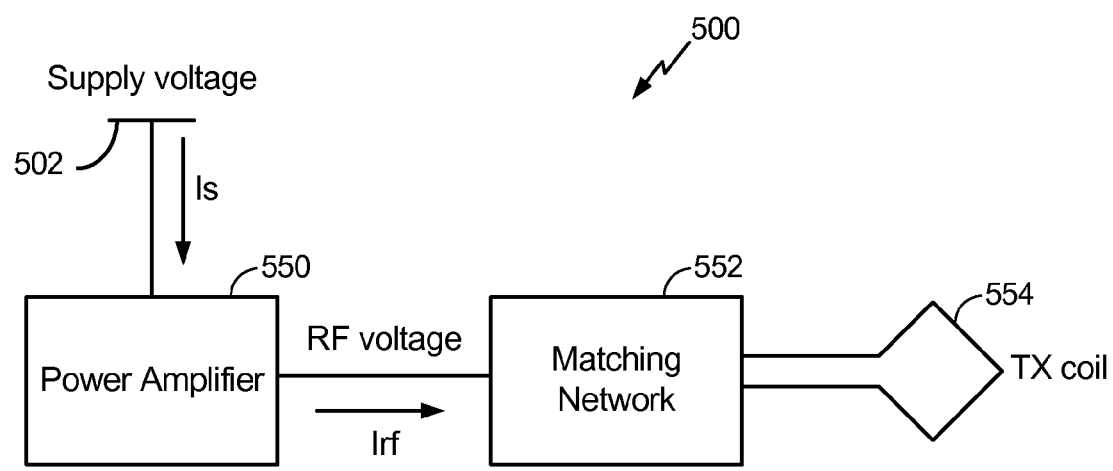
FIG. 8 illustrates a block diagram of a portion of a wireless power transmitter, according to an exemplary embodiment of the present invention.

FIG. 8 illustrates a portion of a wireless power transmitter 500 including a supply voltage 502, a power amplifier 550, a matching network 552, and a transmit coil 554. Further, as illustrated in FIG. 8, supply voltage 502 is provided to an input of power amplifier 550 and a supply current Is may be received by power amplifier 550. Furthermore, an output of power amplifier 550 may comprise an RF voltage and an RF current Irf may be conveyed to matching network 552.

With reference to FIGS. 6-8, another method of detecting one or more non-compliant devices positioned within a charging region of wireless power charger 382, according to an exemplary embodiment of the present invention, will now be described. Transmitter 500 of wireless charger 382 may initially request that each valid receiver (i.e., devices 384) be cloaked. Furthermore, by monitoring at least one of the supply voltage 502, supply current Is, the RF voltage, and RF current Irf, transmitter 500 may be able to determine whether or not a non-compliant device is wirelessly receiving power from therefrom. More specifically, a non-compliant device, which is receiving power from transmitter 500, may cause power amplifier 550 to drive a real load presented to transmitter coil 554, which will be reflected on the RF voltage, RF current Irf, supply voltage 502, and supply current Is. Yet, even more specifically, if a non-compliant device is wirelessly receiving power from transmitter 500, the RF voltage output from power amplifier 550 may decrease.

Figure 9:
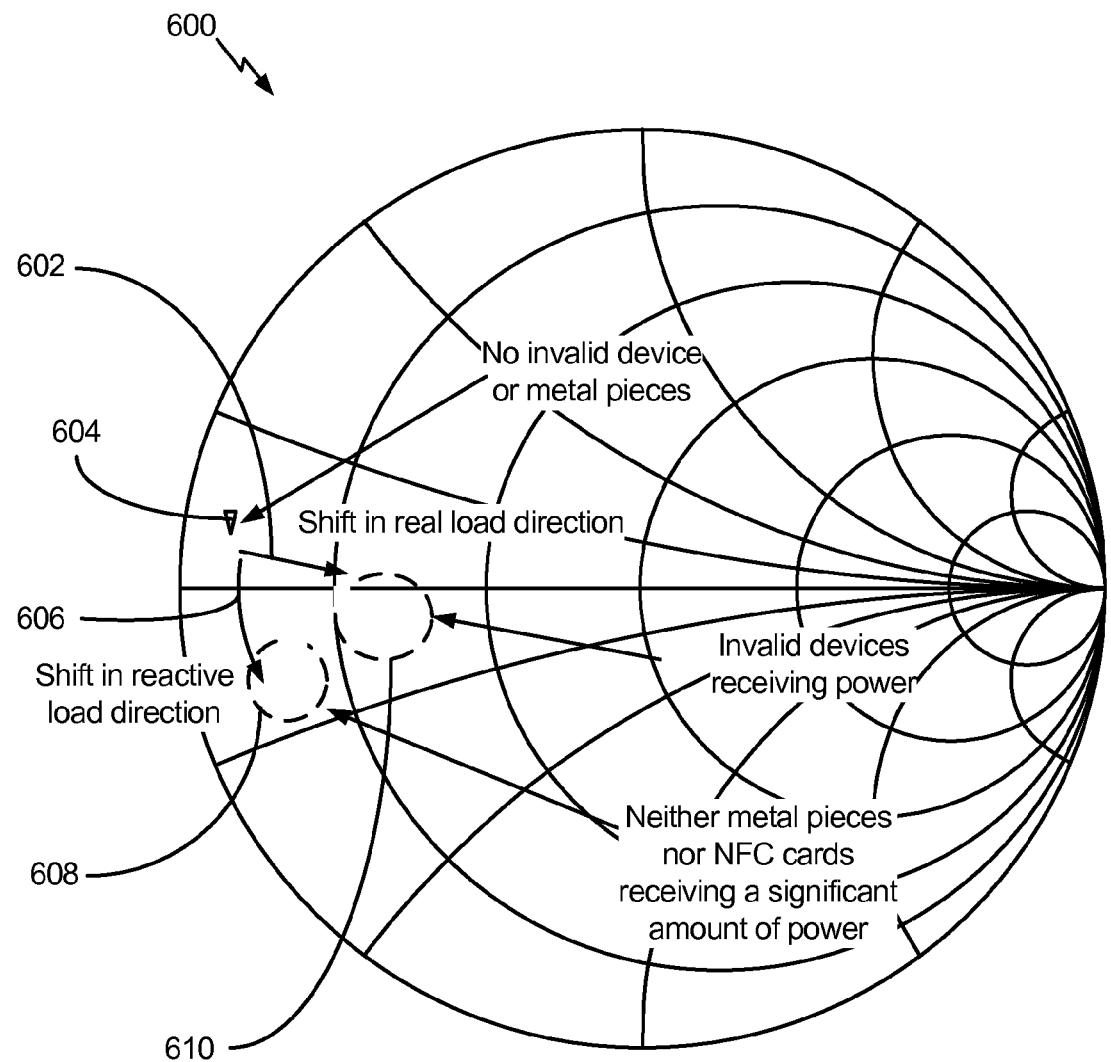
FIG. 9 is a Smith Chart illustrating an impedance response, as detected by a transmitter, due to various devices positioned within a charging region of the transmitter.

FIG. 9 illustrates a Smith Chart 600 illustrating an impedance response, as detected by a transmitter (e.g., transmitter 500), due to various devices positioned within a charging region of the transmitter. A data point 604 represents a response wherein no invalid devices or metal pieces are receiving power. Furthermore, a shift to data point 608, which is represented by reference numeral 606, indicates that neither a metal piece nor anon-compliant device is receiving a significant amount of power. Moreover, a shift to data point 610, which is represented by reference numeral 602, indicates that one or more non-compliant devices are receiving a significant amount of power.

According to another exemplary embodiment, with reference again to FIGS. 6-8, transmitter 500 of wireless charger 382 may request that each valid receiver (i.e., devices 384) be cloaked. Furthermore, by monitoring at least one of the supply voltage 502, supply current Is, the RF voltage output from power amplifier 550, and RF current Irf, transmitter 500 may be able to detect if a non-compliant is receiving power. Receipt of power by a non-compliant device may cause power amplifier 550 to drive a real load presented to transmitter coil 554, which will be reflected on the RF voltage, RF current, the supply voltage, and supply current Is.

With continued reference to FIGS. 6-8, another method of detecting one or more non-compliant devices positioned within a charging region of a wireless power transmitter, according to an exemplary embodiment of the present invention, will now be described. In this exemplary embodiment, transmitter 500 may request all compliant receivers (i.e., devices 384) be cloaked. Furthermore, from the supply current Is and a rectifier voltage (i.e., a voltage at rectifier voltage port 406) on each valid receiver, transmitter 500 may be able to detect if an non-compliant device is receiving power from transmitter 500. A non-compliant device may draw power from transmitter 500, thus, causing an increase in supply current Is at a designated supply voltage 502. If power is being diverted to a non-compliant device (e.g., a NFC card and/or a rogue receiver), a voltage at rectifier voltage port 406 may remain the same or may be reduced. If a device (such as keys or a metal plate) that does not draw power, but detunes a transmitting coil is placed on the transmitting coil, power is not diverted to the device (i.e., the keys or the metal plate). However, the detuning of the transmitting coil will cause the load seen by power amplifier 550 to be more capacitive. This may increase both the supply current Is and a voltage at rectifier voltage port 406. Therefore, by measuring a voltage at rectifier voltage port 406 on a compliant receiver and sending the data to transmitter 500 reverse link communication, transmitter 500 may determine if a non-compliant device (e.g., a NFC card and/or a rouge receiver) is placed on the transmitting coil.

Figure 10:
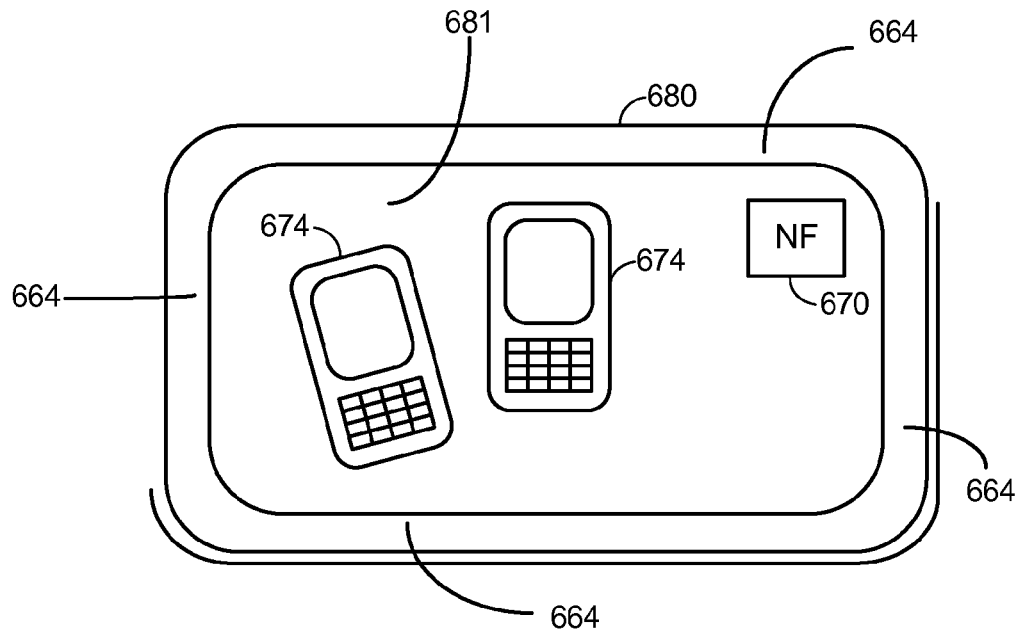
FIG. 10 illustrates a wireless power charger including a "keep out" zone proximate a surface of the wireless power charger, in accordance with an exemplary embodiment of the present invention.
Figure 11:
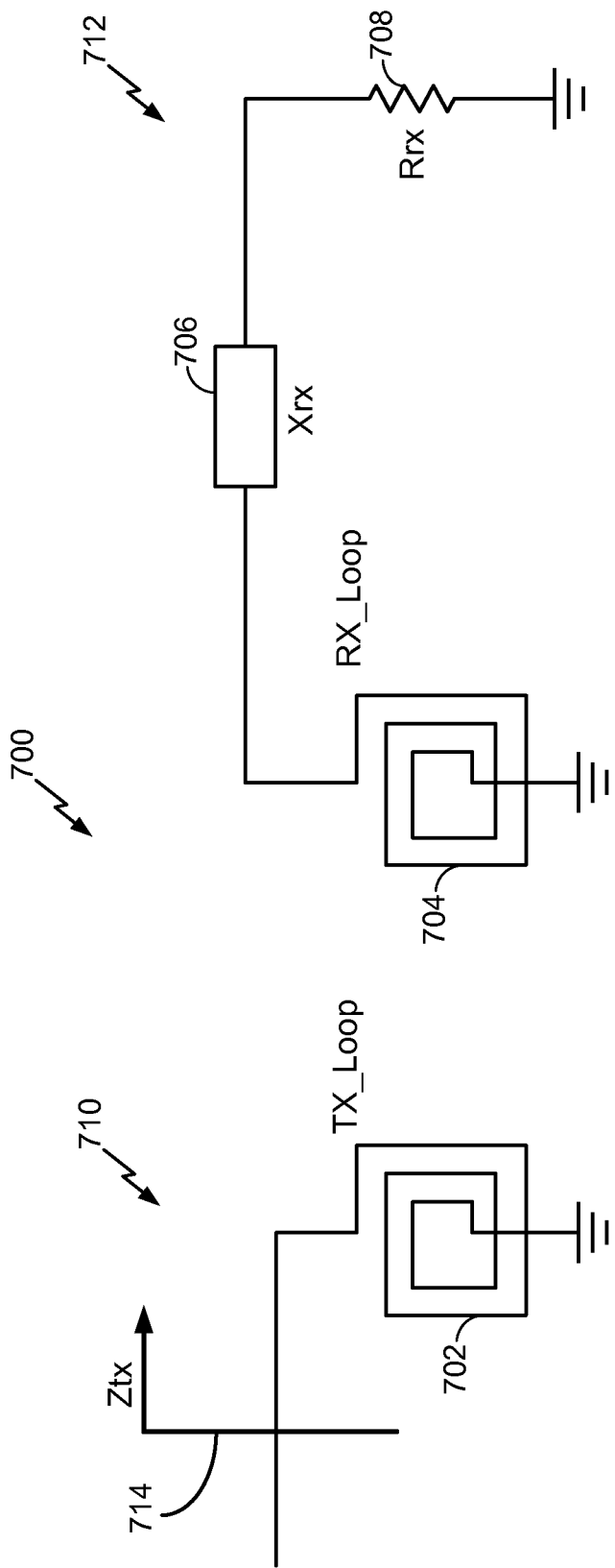
FIG. 11 illustrates a system including portion of a transmitter and a portion of a receiver, according to an exemplary embodiment of the present invention.

With reference to FIGS. 10 and 11, a method of protecting a detected non-compliant device (e.g., an NFC device) will now be described. As noted above, a wireless charger may comprise a region (i.e., an area) designated as a "keep out" zone, which is adjacent to a transmit antenna of the wireless charger and which NFC devices should not be placed. More specifically, as an example, a wireless charger may be configured to prevent a device, such as an NFC device, from being positioned immediately adjacent a transmit antenna. FIG. 10 illustrates a wireless charger 680 having a charging surface 681. As illustrated in FIG. 10, a plurality of wirelessly chargeable devices 674 and a device 670, which may comprise a NFC device, are positioned on charging surface 681. Wireless charger 680 comprises a "keep out" zone 664, which is adjacent to a transmit antenna (not shown in FIG. 10; see transmit antenna 204 of FIG. 4). Preventing placement of device 670 within "keep out" zone 664 may prevent device 670 from receiving too much power from wireless charger SYS.

According to another exemplary embodiment of the present invention, upon detection of one or more non-compliant device, a wireless charger, such as wireless charger 382 may reduce an amount of power that is delivered therefrom. It is note that in this exemplary embodiment, less power may be delivered to compliant devices and, thus, a charging time for each compliant device may increase. Moreover, according to another exemplary embodiment of the present invention, upon detection of one or more non-compliant devices, a wireless charger, such as wireless charger 382 may be shut down and, therefore, may be prevented from transmitting wireless power. As will be appreciated by a person having ordinary skill in the art, in this exemplary embodiment, power may not be delivered to compliant devices positioned with an associated charging region of wireless charger 382.

FIG. 11 illustrates a system 700 including portion of a transmitter 710 including transmitter coil 702 and a portion of a receiver 712 including a receiver coil 704. Receiver 712 further includes an imaginary load 706 ($X_{rx}$) and a real load 708 ($R_{rx}$). An impedance $Z_{tx}$, which is illustrated by arrow 714, as seen by transmitter 710 and associated with receiver 712 may be given by the following equation:

$$Z_{tx} = \frac{w^2 M_{12}^2 R_{rx}}{R_{rx}^2 + (wM_{22} + X_{rx})^2} + j\left[wM_{11} - \frac{w^2 M_{12}^2 (wM_{22} + X_{rx})}{R_{rx}^2 + (wM_{22} + X_{rx})^2}\right] \quad (1)$$

wherein $Z_{tx}$ is the impedance looking into the transmitting coil, ω is the frequency in radians, $M_{11}$ is the self inductance of transmitting coil 702, $M_{22}$ is the self inductance of receiving coil 704, $M_{12}$ is the mutual inductance between transmitting coil 702 and receiving coil 704, $R_{rx}$ is the real load of the receiver 712, and $X_{rx}$ is the imaginary load of the receiver 712.

Furthermore, if transmitter coil 702 and receiver coil 704 are series tuned (i.e., $\omega*M_{22}+X_{rx}=0$ and the series capacitor at the transmitting coil generates a negative reactance that is equivalent to $\omega*M_{11}$), the impedance $Z_{tx}$ as seen by transmitter 710 and associated with receiver 712 may be given by:

$$Z_{tx} = \frac{\omega^2 M_{12}^2}{R_{rx}} \quad (2)$$

Moreover, an non-compliant device, such as an NFC device, may behave like an additional receiver. Accordingly, equation (2) may be modified in the following manner to include a response of an NFC device:

$$Z_{tx} = \frac{\omega^2 M_{12}^2}{R_{rx}} + \frac{\omega^2 M_{12\_NFC}^2}{R_{rx\_NFC}} \quad (3)$$

wherein $M_{12\_NFC}$ is the mutual inductance between transmitting coil 702 and $R_{rx\_NFC}$ is the real load of the NFC device With reference to FIG. 11 and equation (3), power distribution between a compliant device and an NFC device may be determined by the impedance presented to the transmitter ($Z_{tx}$) by the compliant device and NFC device. In order to divert more power to the compliant device, a load impedance ($R_{rx}$) of the compliant device may be reduced. Since the impedance presented to transmitter ($Z_{tx}$) remains constant, more power may be diverted to the compliant device and, thus, the NFC device may receive less power. It is noted that reducing a load impedance of a compliant device by too much (e.g. from 15Ω to 5Ω) may degrade an efficiency of a receiver (i.e., a receiving coil and a rectifier) of the compliant device.

Figure 12:
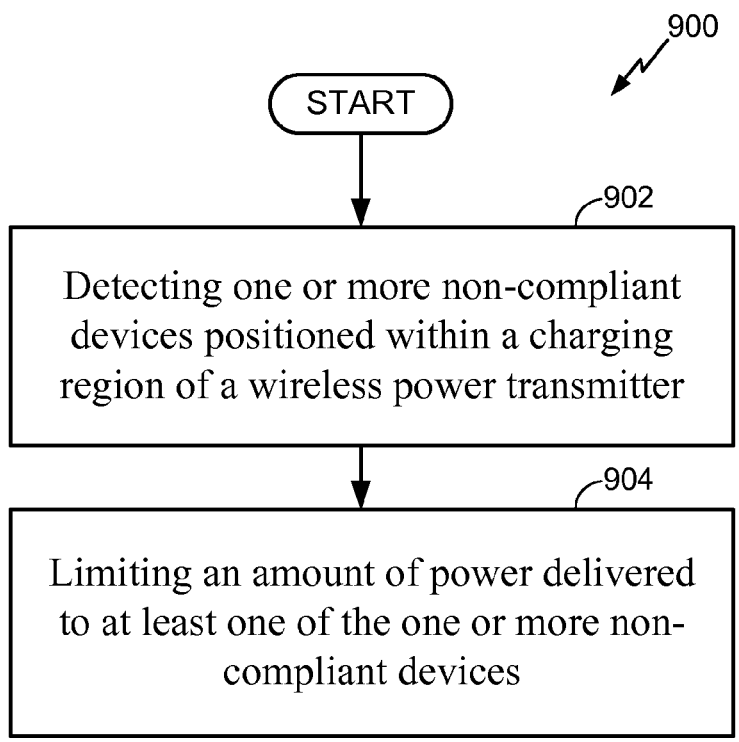
FIG. 12 is a flowchart illustrating a method, in accordance with an exemplary embodiment of the present invention.

FIG. 12 is a flowchart illustrating another method 900, in accordance with one or more exemplary embodiments. Method 900 may include detecting one or more non-compliant devices positioned within a charging region of a wireless power transmitter (depicted by numeral 902). Method 900 may further include limiting an amount of power delivered to at least one of the one or more non-compliant devices (depicted by numeral 904).

Figure 13:
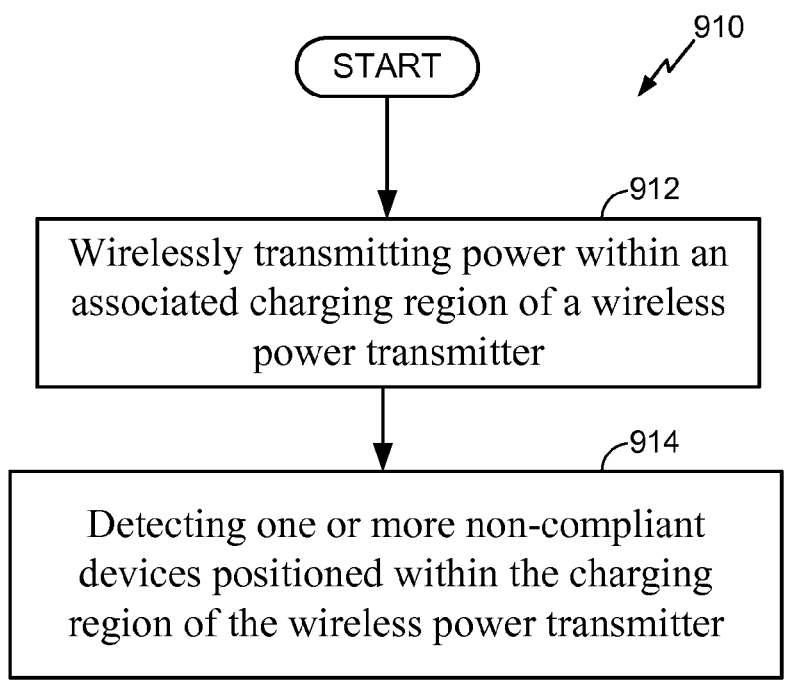
FIG. 13 is a flowchart illustrating another method, in accordance with an exemplary embodiment of the present invention.

FIG. 13 is a flowchart illustrating another method 910, in accordance with one or more exemplary embodiments. Method 910 may include wirelessly transmitting power within an associated charging region of a wireless power transmitter (depicted by numeral 912). Method 910 may further include detecting one or more non-compliant devices positioned within the charging region of the wireless power transmitter (depicted by numeral 914).

Figure 14:
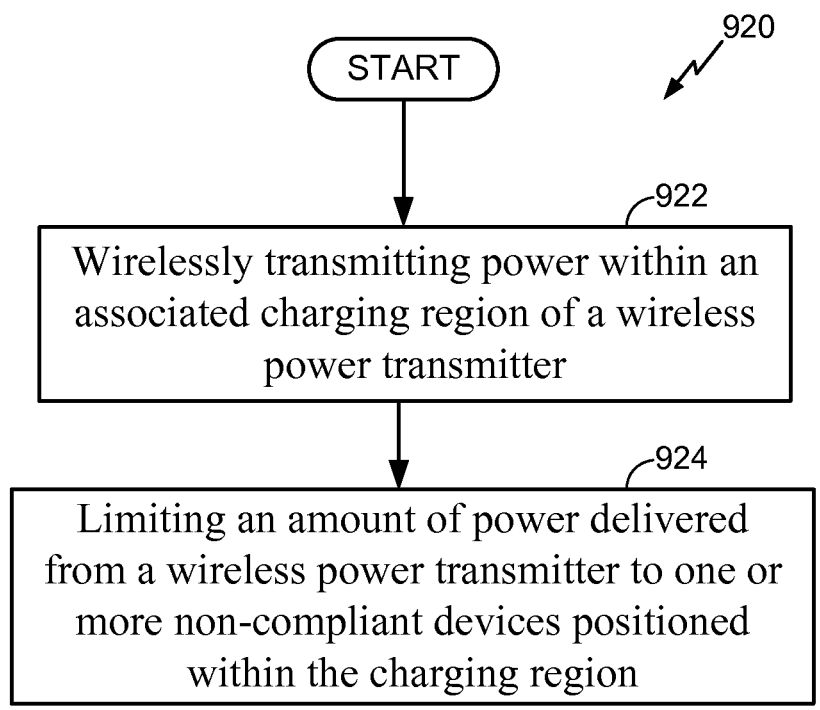
FIG. 14 is a flowchart illustrating yet another method, in accordance with an exemplary embodiment of the present invention.

FIG. 14 is a flowchart illustrating another method 920, in accordance with one or more exemplary embodiments. Method 920 may include wirelessly transmitting power within an associated charging region of a wireless power transmitter (depicted by numeral 922). Method 920 may further include limiting an amount of power delivered from a wireless power transmitter to one or more non-compliant devices positioned within the charging region (depicted by numeral 924).

It is noted that a wireless power transmitter may utilize one or more of the detection schemes described above to detect one or more non-compliant devices. Furthermore, the wireless power transmitter may utilize one or more of the protection schemes described above to limit an amount of power conveyed to the one or more non-compliant devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus for wirelessly transferring power, comprising:
a wireless power transmitter configured to wirelessly transmit power at a level sufficient to power or charge a first device positioned within a charging region; and
a controller configured to:
determine a first amount of power, wherein the first amount of power is an amount of power transmitted by the wireless power transmitter; and
determine a second amount of power, wherein the second amount of power is an amount of power received by the first device when positioned within the charging region, the wireless power transmitter configured to reduce power transmission in response to determining unaccounted power based on a difference between the first amount of power and the second amount of power.

2. The apparatus of claim 1, wherein a non-compliant device is detected based on determining the unaccounted power, and wherein the wireless power transmitter is configured to reduce the power transmission to the non-compliant device.

3. The apparatus of claim 2, wherein the wireless power transmitter is configured to reduce the power transmission to the non-compliant device by signaling to the first device to reduce a load impedance of the first device.

4. The apparatus of claim 2, wherein the non-compliant device comprises a near-field communication (NFC) device.

5. The apparatus of claim 1, wherein the wireless power transmitter is configured to stop power transmission.

6. The apparatus of claim 1, wherein the controller is configured to determine the first amount of power by monitoring at least one of a supply voltage of the wireless power transmitter, a supply current of the wireless power transmitter, an RF voltage of the wireless power transmitter, or an RF current of the wireless power transmitter.

7. The apparatus of claim 1, wherein the controller is configured to determine the first amount of power by at least one of determining a coil parasitic resistance via a lookup table for a plurality of loading conditions or determining a power amplifier efficiency of a power amplifier for the plurality of loading conditions.

8. The apparatus of claim 1, wherein the controller is configured to receive one or more reverse link signals from the first device to determine the second amount of power, the one or more reverse link signals indicating the second amount of power.

9. The apparatus of claim 1, wherein the controller is configured to determine the second amount of power by at least one of:
receiving an indication of a coil parasitic resistance from the first device for a plurality of loading conditions;

receiving an indication of a load impedance from the first device based on a first current sensed by a first current sensor and a rectifier voltage at a rectifier voltage port at the first device;
receiving an indication of a rectifier efficiency from the first device based on the rectifier voltage at the rectifier voltage port; or
receiving an indication of a buck converter efficiency from the first device based on a buck converter voltage at a buck voltage port and a second current sensed by a second current sensor of the first device.

10. The apparatus of claim 1, wherein the controller is configured to determine the first amount of power while the wireless power transmitter is transmitting at a constant level, and wherein the controller is configured to determine the second amount of power while the first device receives power at the constant level.

11. The Apparatus of claim 1, wherein the first amount of power is transmitted via a wireless field and wherein the first device is coupled to the wireless field so as to receive the second amount of power.

12. A method for wirelessly transferring power, comprising:
determining a first amount of power, wherein the first amount of power is an amount of power transmitted by a wireless power transmitter within a charging region;
determining a second amount of power, wherein the second amount of power is an amount of power received by a first device when positioned within the charging region of the wireless power transmitter; and
reducing power transmission in response to determining unaccounted power based on a difference between the first amount of power and the second amount of power.

13. The method of claim 12, wherein a non-compliant device is detected based on determining the unaccounted power, and wherein reducing power transmission comprises reducing the power transmission to the non-compliant device.

14. The method of claim 13, wherein reducing power transmission to the non-compliant device comprises signaling to the first device to reduce a load impedance of the first device.

15. The method of claim 13, wherein the non-compliant device comprises a near-field communication (NFC) device.

16. The method of claim 12, wherein reducing power transmission comprises stopping power transmission.

17. The method of claim 12, wherein determining the first amount of power comprises monitoring at least one of a supply voltage of the wireless power transmitter, a supply current of the wireless power transmitter, an RF voltage of the wireless power transmitter, or an RF current of the wireless power transmitter.

18. The method of claim 12, wherein determining the first amount of power comprises at least one of determining a coil parasitic resistance via a lookup table for a plurality of loading conditions or determining a power amplifier efficiency of a power amplifier for the plurality of loading conditions.

19. The method of claim 12, wherein determining the second amount of power comprises receiving one or more reverse link signals from the first device, the one or more reverse link signals indicating the second amount of power.

20. The method of claim 12, wherein determining the second amount of power comprises at least one of:
receiving an indication of a coil parasitic resistance from the first device for a plurality of loading conditions;
receiving an indication of a load impedance from the first device based on a first current sensed by a first current sensor and a rectifier voltage at a rectifier voltage port at the first device;
receiving an indication of a rectifier efficiency from the first device based on the rectifier voltage at the rectifier voltage port; or
receiving an indication of a buck converter efficiency from the first device based on a buck converter voltage at a buck voltage port and a second current sensed by a second current sensor of the one first device.

21. The method of claim 12, wherein determining the first amount of power comprises determining the first amount of power while the wireless power transmitter is transmitting at a constant level, and wherein determining the second amount of power comprises determining the second amount of power while the first device receives power at the constant level.

22. An apparatus for wirelessly transferring power, comprising:
means for wirelessly transmitting power at a level sufficient to power or charge a first device positioned within a charging region;
means for determining a first amount of power, wherein the first amount of power is an amount of power transmitted by the transmitting means;
means for determining a second amount of power, wherein the second amount of power is an amount of power received by the first device when positioned within the charging region; and
means for reducing power transmission of the transmitting means in response to determining unaccounted power based on a difference between the first amount of power and the second amount of power.

23. The apparatus of claim 22, wherein a non-compliant device is detected based on determining the unaccounted power, and wherein the means for reducing power transmission comprises means for reducing power transmission to the non-compliant device.

24. The apparatus of claim 23, wherein the non-compliant device comprises a near-field communication (NFC) device.

25. The apparatus of claim 22, wherein the means for determining the first amount of power comprises means for monitoring at least one of a supply voltage of the transmitting means, a supply current of the transmitting means, an RF voltage of the transmitting means, or an RF current of the transmitting means.

26. The apparatus of claim 22, wherein the means for determining the second amount of power comprises means for receiving one or more reverse link signals from the first device, the one or more reverse link signals indicating the second amount of power.

* * * * *